H. P., E. M., F. A. & L. W. LEY.
EXTENSION PIPE.
APPLICATION FILED FEB. 17, 1910.
982,836.
Patented Jan. 31, 1911.
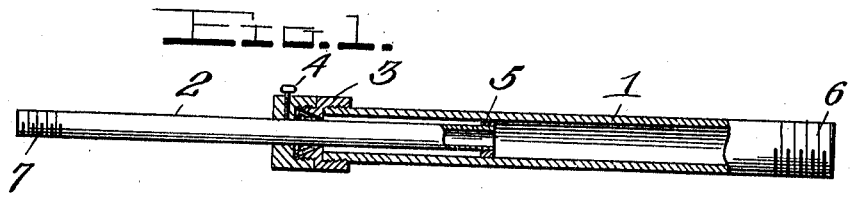
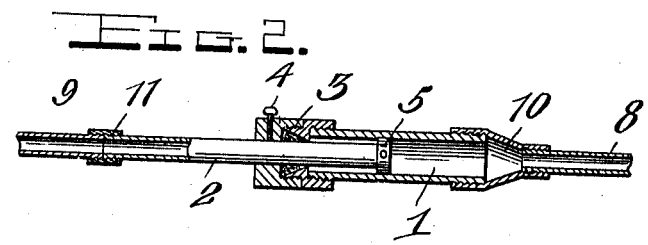
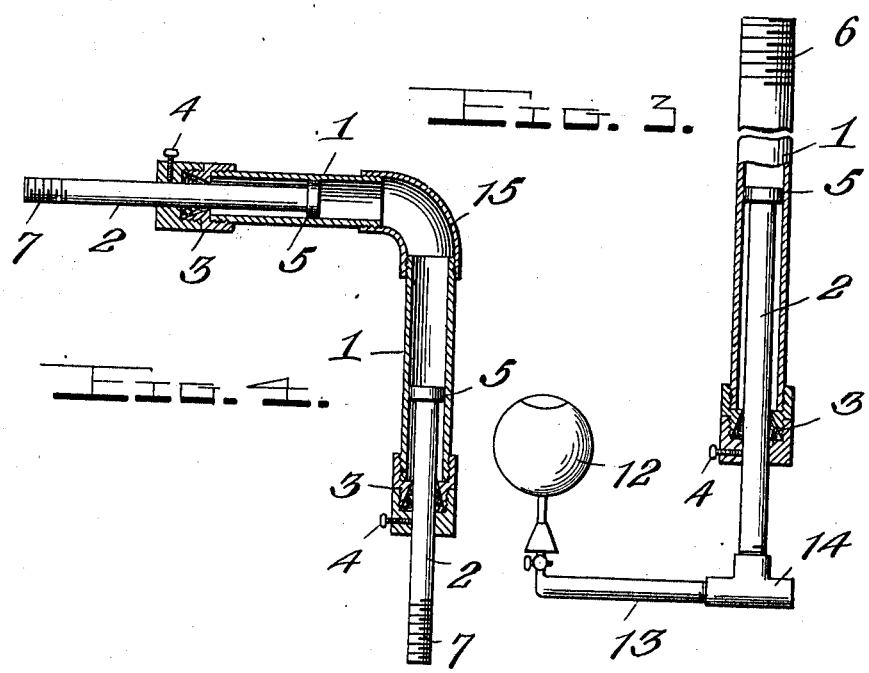
Witnesses
Chas. L. Griesbauer
E. M. Ricketts
Inventors
H.P.Ley, F.A.Ley, E.M.Ley
and L.W.Ley.
By Watson E. Coleman.
Attorney

UNITED STATES PATENT OFFICE.

HENRY P. LEY, EDWARD M. LEY, FRANK A. LEY, AND LAWRENCE W. LEY, OF JACKSONVILLE, OHIO.

EXTENSION-PIPE.

982,836.

Specification of Letters Patent.   Patented Jan. 31, 1911.

Application filed February 17, 1910. Serial No. 544,428.

*To all whom it may concern:*

Be it known that we, HENRY P. LEY, EDWARD M. LEY, FRANK A. LEY, and LAWRENCE W. LEY, citizens of the United States, residing at Jacksonville, in the county of Athens and State of Ohio, have invented certain new and useful Improvements in Extension-Pipes, of which the following is a specification, reference being had to the accompanying drawings.

This invention relates to improvements in extensible and adjustable pipes for use in conducting gas, compressed air, steam, water and other fluids.

The object of the invention is to provide an extensible and adjustable pipe which may be used in connection with gas lamps, gas stoves, and various other devices to which a gas, liquid or other fluid must be conducted, the peculiar construction of the parts enabling the device to be shifted or adjusted without danger of leakage.

With the above and other objects in view, the invention consists of the novel features of construction and the combination and arrangement of parts hereinafter fully described and claimed, and illustrated in the accompanying drawings, in which—

Figure 1 is a sectional view through an extensible pipe or conductor constructed in accordance with the invention; Fig. 2 is a sectional view through a form of the invention adapted for use as a union between two pipes; Fig. 3 is a sectional view showing the use of the invention as an adjustable chandelier; and Fig. 4 is a sectional view of an angular conductor embodying our invention and having sliding and swinging sections.

Referring more particularly to Fig. 1 of the drawings 1 and 2 denote telescopically engaged pipes, the main or outer pipe 1 having at one of its ends a packing box 3 through which the pipe 2 extends and in which it may slide. This packing box is of peculiar construction, whereby gas, liquid or other fluid passing through the pipes will be prevented from escaping, and adjacent the outer end of said box is a transverse screw threaded opening to receive a set screw 4 by means of which the two pipes may be secured in adjusted position. An annular stop collar 5 is provided on the inner end of the pipe or section 2 to prevent the latter from being pulled out of the pipe 1 and the packing box. The extremities of the pipes or sections 1, 2 may be screw threaded, as shown at 6 and 7, or otherwise constructed for attachment to pipes or objects which are to be connected.

The device may be made in any size. When made very short, as shown in Fig. 2, it may be used as a union for connecting two pipes 8, 9 or other devices or objects, screw coupling sleeves 10, 11 being preferably employed for uniting the parts.

In Fig. 3 we have shown our invention embodied in a gas chandelier. As here illustrated the gas burner or lamp 12 is connected to a branch or bracket pipe 13 which latter is in turn connected by an L or a T-coupling 14 to the inner pipe or section of our improved extensible pipe.

In Fig. 4 we have shown two of the extension pipes united by an L-connection 15 whereby one section may swing with respect to the other and each may be varied in length. From this illustration it will be seen that any number of the improved extension pipes may be connected together according to the use which they are intended to serve and it will be further understood that the construction illustrated in Fig. 1 may be repeated and the extension pipe composed of any number of slidably engaged sections, instead of just the two as shown.

It will be understood that any kind of packing may be used in the packing devices above referred to.

While several of the uses of the invention have been illustrated it will be understood that the device may be used for various other purposes and in various other ways.

Having thus described the invention what is claimed is:

The herein described extension pipe comprising telescopically related inner and outer cylindrical pipe sections, the former having a collar at its inner end operating in the bore of the latter, and spacing the inner section from the wall of the bore of the outer section, a packing box section screwed externally to one end of the outer pipe section, and provided with a reduced screw threaded end having a conical packing receiving opening, the smallest diameter of which corresponds with the external diameter of the inner pipe section, and the said reduced externally threaded end of said packing box section forming an annular shoulder within the bore of the outer pipe section, to coact with the said collar of the inner pipe section to limit the longitudinal movement of said inner pipe section in one direction, the larger diameter of the packing-receiving-opening extending substantially to the external threads of the packing box section and a second packing box section comprising a cap internally threaded to engage the threaded reduced end of the first mentioned packing box section and bear on the entire base of the packing, and further provided with a bore through which the inner pipe section extends, and with a set screw to engage said inner pipe section.

In testimony whereof we hereunto affix our signatures in the presence of two witnesses.

HENRY P. LEY.
EDWARD M. LEY.
FRANK A. LEY.
LAWRENCE W. LEY.

Witnesses:
EMMA D. KING,
ALMA M. KING.